Figure 12:
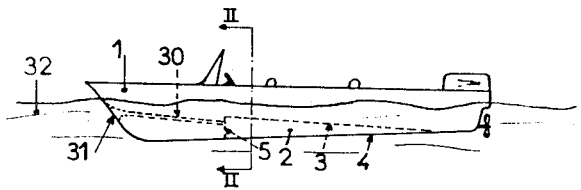

United States Patent
Roumejon

[15] 3,662,700
[45] May 16, 1972

[54] FLOATING HULL TO MAINTAIN A CUSHION OF AIR

[72] Inventor: Leon Roumejon, 22 bis Boulevard de Bellevue, Chambery, Savoie, France

[22] Filed: Apr. 16, 1970

[21] Appl. No.: 29,187

[30] Foreign Application Priority Data

Apr. 18, 1969 France.................................6911368
Mar. 10, 1970 France.................................7009576

[52] U.S. Cl. .........................................................114/67 A
[51] Int. Cl..........................................................B63b 1/38
[58] Field of Search ........................................114/67 A, 62

[56] References Cited

UNITED STATES PATENTS

| 652,876 | 7/1900 | Andrade | 114/62 X |
| 2,423,796 | 7/1947 | Platt | 114/62 X |
| 3,161,171 | 12/1964 | Ljungstrom | 114/67 A |
| 3,382,678 | 5/1968 | Reh | 114/67 A |

*Primary Examiner*—Andrew H. Farrell
*Attorney*—Sughrue, Rothwell, Mion, Zinn & Macpeak

[57] ABSTRACT

A floating hull is provided with an elongated tunnel on the bottom surface thereof the forward end of which may be terminated by a bulkhead. The heart of the tunnel may gradually diminish toward the stern of the boat or the heart of the tunnel may be constant from the bulkhead to the stern of the boat. An air intake opening is placed at the bow of the hull above the normal water-line of the boat and is disposed in communication with the tunnel in the vicinity of the bulkhead defining the forward end of the tunnel.

5 Claims, 17 Drawing Figures

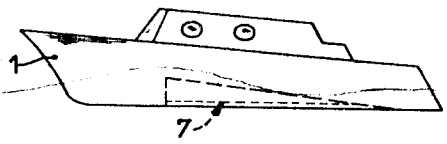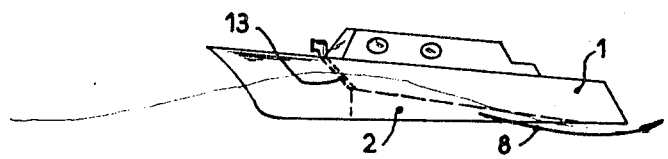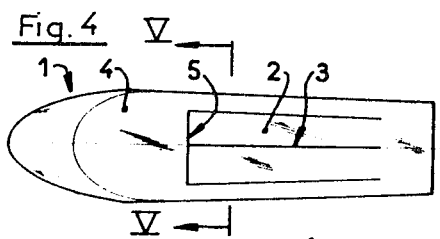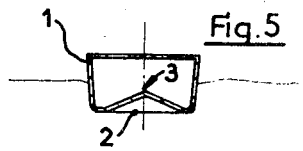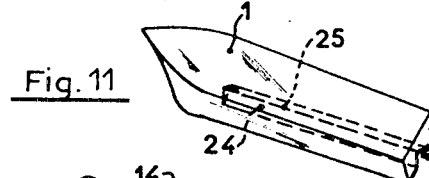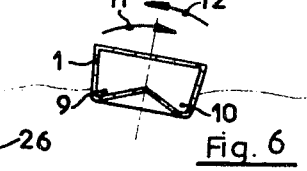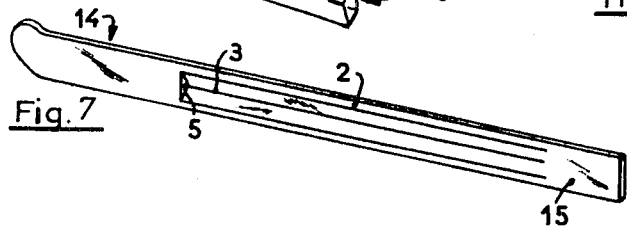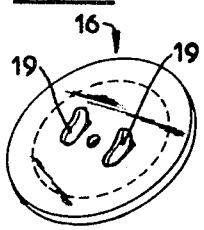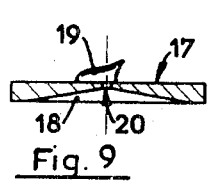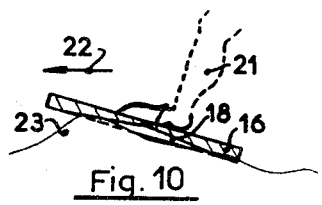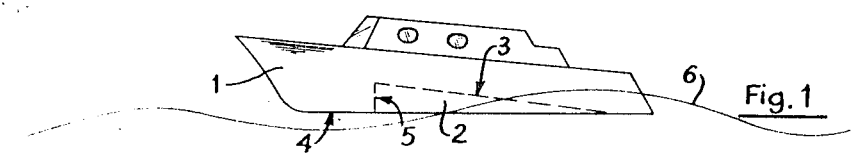

FLOATING HULL TO MAINTAIN A CUSHION OF AIR

The present invention relates to a floating hull which may be the hull of a vessel or craft, or may be the body of a water ski or water-ski board, or a float of a seaplane, flying boat, hydrofoil or other floating appliance. It will be appreciated therefore that the term "hull" is used herein in its broadest sense.

Floating hulls of conventional type are designed so that their submerged surface is entirely on contact with the water. This presents various well-known disadvantages, and in particular retards the movement of the hull at high speed.

In order to remedy this disadvantage, it has been proposed to construct a hull fitted with a blower which maintains a cushion of air which bears on the water below the hull. Experience has shown that this system is extremely costly and complicated. Moreover, it necessitates the use of a flexible skirt around the lower part of the hull, to avoid lateral leakages of the air cushion. This skirt constitutes a fragile component and it is the cause of numerous breakdowns.

The present invention has the aim of avoiding these disadvantages by the construction of a hull below which a cushion of air capable of facilitating high speed movement is maintained by the movement of the hull alone. In addition the special profile provided by the invention possesses anti-roll properties.

According to this invention a floating hull has the underside of the part which will be submerged when the hull is fulfilling its normal function, formed to provide the roof of a tunnel of inverted V-shaped transverse section.

In a first possible method of carrying out the invention the depth of the tunnel diminishes continuously towards the rear of the hull. In a variant, this height remains constant so that the tunnel is open at the rear of the hull.

In certain cases, the formation and the renewal of the air cushion are assisted by the provision, at the forward upper point of the tunnel, of a vent which communicates with the atmosphere above the hull. This vent may be fitted with a non-return valve, which will allow the exterior air to be drawn into the cushion, but will prevent the air in the cushion being expelled to the exterior.

Finally, the particular shape of this profile allows the air expelled from the cushion to be evacuated constantly through the rear of the hull. This additional effect contributes to the propulsion of the hull on which are conferred extremely favorable "slip" properties.

At the fore end the tunnel may be terminated by a transverse bulkhead in which at its highest point is in communication by a vent to an air intake opening situated at the front of the hull. According to another preferred feature of the invention, this air intake opening is placed at the front below the water-line observed when the hull is motionless on the water. Thus, when the hull is driven at sufficient speed, it rises up at the front and the opening of the vent is then open to the atmospheric air above the water level. This vent may also be fitted with a non-return valve.

Figure 13:
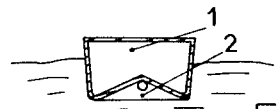
Figure 14:
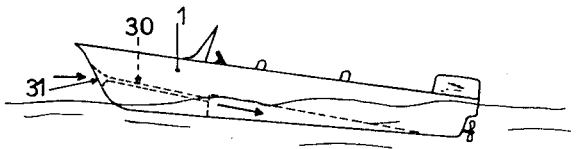
Figure 15:
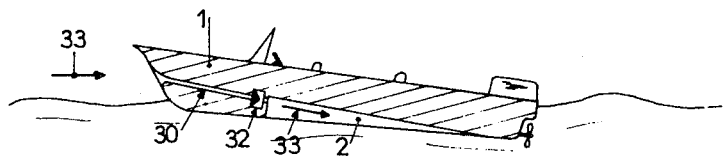
Figure 16:
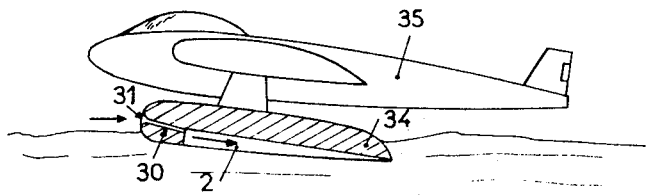
Figure 17:

Several hull constructions in accordance with the invention will now be described by way of example only with reference to the accompanying drawings in which:

FIG. 1 is a side view of a light craft during travel through waves,

FIG. 2 is a view similar to FIG. 1, but showing the situation at a later stage in the travel, FIG. 3 is a view similar to FIG. 1 at a still later stage, and showing also a vent pipe, FIG. 4 is a view on the underside of the hull of the craft shown in FIGS. 1 to 3, FIG. 5 is a section along the line V—V in FIG. 4, FIG. 6 is a similar section illustrating the anti-rolling operation of the hull, FIG. 7 is a perspective view of the lower face of a water ski, FIG. 8 is a perspective view of the upper face of a board for the practice of water skiing, FIG. 9 is an axial section of the board shown in FIG. 8, FIG. 10 illustrates the action of this board when it is moving on the water, FIG. 11 illustrates another variant in a craft wherein the height of the tunnel remains constant so that it is open at the rear of the hull, FIG. 12 is a longitudinal section of another hull floating on the water, FIG. 13 is a transverse section along the line II—II in FIG. 12, FIG. 14 shows this same hull which is rising up at the front when it is driven at full speed, FIG. 15 shows a variant in which an aerodynamic vent is fitted with a non-return valve, FIG. 16 shows the application of the invention to the floats of a sea-plane, and FIG. 17 shows a variant in which the tunnel has a constant depth.

There is shown in FIGS. 1 to 6 a light craft of which the hull 1 is constructed according to the invention. On the lower face of this hull 1 there is hollowed a tunnel 2 with an inverted V-shaped section, the top of which is constituted by an apex 3 in extending longitudinally of the hull 1.

In addition, the depth of the tunnel 2 continuously decreases from fore to aft, that is to say that the line 3 has an inclined position, higher at the fore than at the aft, in relation to the bottom 4 of the hull 1. At the fore end the tunnel 2 is terminated by a flat face 5.

The operation of this device is as follows:

When the craft is moving on the water, the surface 6 of the water always has undulations of greater or smaller size constituted by the waves, or resulting from the eddies due to movement of the craft. In consequence, the fore end of the tunnel 2 is periodically open to the free air (as illustrated in FIG. 1). At this moment, the tunnel 2 is filled with air. Then the water returns to wash the whole of the hull (FIG. 2), so that a cushion of air is trapped in the tunnel 2 above a liquid surface indicated by the reference number 7. The presence of this cushion of air offers several advantages.

First of all, a part of the weight of the hull 1 is carried, not directly by the water, but by the compressed air. Since this air is compressible, there is observed a suspension effect which avoids shocks on the hull and improves both the stability of the craft and the comfort of the passengers.

In addition, the fact that a large proportion of the surface of the hull bears on air and not on water confers on the craft an extremely favorable "slip", which decreases the power necessary for its propulsion.

Finally, the movement of the surface of the waves periodically uncovers the after portion of the hull 1, and in consequence, the tunnel 2 (as shown in FIG. 3). In these conditions at least a part of the compressed cushion of air contained in the tunnel 2 is expelled rearwards (arrow 8), which contributes by the reaction effect, to the propulsion of the craft.

Finally, an additional very important effect is illustrated in FIGS. 5 and 6. From the fact of the transverse inverted V profile of the tunnel 2, it will be seen that the hull 1 presents in its lower part two similar lateral caissons 9 and 10, each having a width which diminishes downwardly. In consequence, if rolling tends to sway the hull 1 in the direction indicated in FIG. 6 by the arrows 11, it will be seen that this forces the caisson 10 into the water, while the caisson 9 is lifted, so that there is created an inverse overturning couple in the direction of the arrow 12. This couple is due to the difference in the Archimedean thrusts being exercised on the caissons 9 and 10 in the case of tilting of the hull. There is therefore observed an anti-rolling effect which is developed automatically.

In order to facilitate the periodic refilling of the tunnel 2 with air, if required, there may be provided an aeration vent 13 (FIG. 3) which puts the upper forward point of the tunnel 2 in communication with the external air above the hull 1. This vent 13 may be fitted, if desired, with a non-return valve which allows the external air to penetrate freely into the tunnel 2 while it opposes any expulsion of the air from the cushion back through the vent 13.

There is shown in FIG. 7 a water ski, the body 14 of which is formed with a tunnel 2. Here again the tunnel has an inverted V-shaped profile and its apex 3 is inclined in such a way as to give it a greater depth at the front, in the vicinity of the terminal face 5. At the rear, the tunnel 2 has no depth, that is to say, it blends into the lower face 15 of the body 14.

The operation is similar to that which has already been described, that is to say, that from the existance of speed and eddies, a cushion of compressed air is periodically maintained in the tunnel 2 to give the ski a very favorable "slip."

In FIGS. 8 to 10 there is shown a board 16 which also may be used for the practice of water skiing. This board has a circular shape and it has a flat upper face 17, while on the underside it is hollowed to form a cavity 18 of which the depth is greater at the center. It will be seen that in any diametral section (FIG. 9) this cavity forms a V-shaped profile of which the top is at the center of the disc.

One or two attachments 19 may be provided on the upper face 17 of the board 16, to take the feet of the skier.

Finally, there may be provided in the center of the board 16, a perforation 20 which puts the top of the cavity 18 in communication with the exterior atmosphere. It will, however, be seen that the presence of this perforation 20 is not obligatory. In addition, as in the case of the vent 13, the perforation 20 may, if required, be fitted with a non-return valve.

Here again the operation is similar to that described with reference to FIGS. 1 to 6 and one phase of it is illustrated in FIG. 10. The skier 21 being towed in the direction of the arrow 22 is upright on the board 16 which takes on an orientation inclined to the horizontal. A cushion of air is created in the cavity 18 due to the presence of an eddy 23 on the surface of the water. This cushion of air offers the advantages already described as concerns "suspension" and "slip." In addition, given that the board 16 is circular, it facilitates the turns of the skier, notably when the latter wishes to turn round and be towed backwards.

In the alternative shown in FIG. 11, there is provided below the hull 1 of a light craft, a tunnel 24, the depth of which remains constant, that is to say, that its upper margin 25 is parallel to the base of the hull. Thus, this tunnel 24 opens rearwards by an opening 26. Here again there may be provided if desired, a vent 13 at the fore end. This variant may equally be used for a water ski.

There is shown in FIG. 12 nd 13 a boat which the hull 1, carries in its lower part a tunnel 2 with an inverted V transverse section. The top of this tunnel is formed by an apex 3 lying in the longitudinal direction of the hull 1. The depth of the tunnel 2 continuously diminishes from fore to aft, that is to say, that the apex 3 has an inclined position, higher at the fore end than at the after end in relation to the bottom 4 of the hull. At the fore end, the tunnel 2 is terminated by a flat transverse face 5, approximately vertical.

The deepest point of the tunnel 2 is thus constituted by the fore end of the apex 3 at its junction with the transverse face 5.

In this region there is made to open an aerodynamic vent 30 which opens at the fore end of the hull 1 at a port 31 situated below what is the water-line when the boat is motionless on the water 32 (FIG. 12).

On the other hand, the arrangement is such that when the hull 1 is driven at full speed (FIG. 14) it rises up at the fore end and the opening 31 then opens to the atmospheric air above the level of the water. From the fact of the dynamic pressure resulting from the forward speed of the hull 1, air rushes through this opening 31 into the vent 30 from which it is driven into the tunnel 2. As has been previously indicated, this contributes to maintaining in the tunnel 2 a cushion of air which greatly improves the "slip" of the hull.

There is shown in FIG. 15 a variant in which a non-return valve 32 is inserted in the aerodynamic vent 30. This valve allows the air to penetrate freely into the tunnel 2 (arrows 33) but it prevents any flow in the opposite direction in the vent 30. This arrangement principally allows the air trapped in the tunnel 2 to be compressed by the effect of the relative natural movement of the hull 1 and waves.

There is shown in FIG. 16 a variant in which the hull is constituted by a float 34 of a sea-plane 35. As previously, each float 34 is provided with a V-tunnel 2 with an aerodynamic vent 30 of which the forward opening 31 opens into the atmospheric air when the float 34 rises up at the fore end through the effect of speed, whilst it is situated below the water-line when the machine is at rest.

In the example of FIG. 17 (which corresponds to FIG. 11) the aforementioned vent 30 is fitted to a tunnel 26 the depth of which is constant from fore to aft.

What I claim is:

1. A floating hull having an underside adapted to be submerged when the hull is fulfilling its normal function, a tunnel formed in said underside having an inverted V-shaped section throughout the length thereof, a transverse bulkhead disposed at the forward end of said tunnel, said bulkhead being provided with an opening adjacent the apex of the inverted V-shaped tunnel, an air intake opening formed in the fore end of said hull, and a vent extending between said openings to conduct air to said tunnel.

2. A floating hull according to claim 1, in which the depth of the tunnel deceases continuously towards the aft of the hull.

3. A floating hull according to claim 1, in which the depth of the tunnel is constant through its length, the tunnel opening at the aft end of the hull.

4. A floating hull according to claim 1, in which a non-return valve is fitted in the vent.

5. A floating hull according to claim 1, in which the air intake opening of the vent is situated at the fore end of the hull below what is the water-line when the hull is motionless on the water, the arrangement being such that the opening is above the water level when the hull rises up at the fore end due to the effect of speed.

* * * * *